No. 611,330. Patented Sept. 27, 1898.
E. MANULA.
CAN SOLDERING MACHINE.
(Application filed June 8, 1898.)
(No Model.)
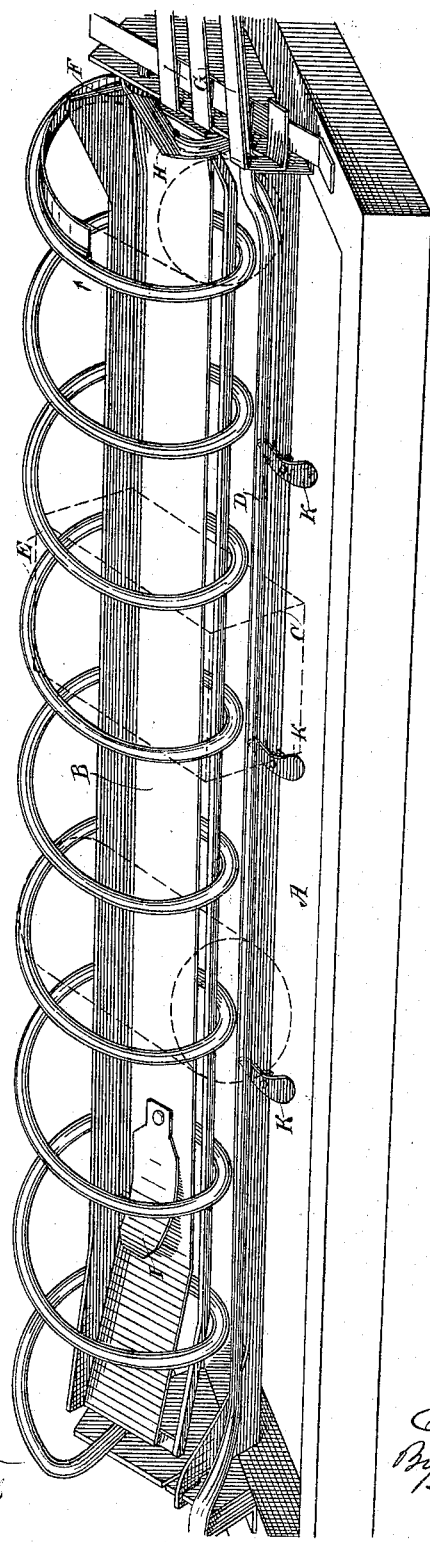
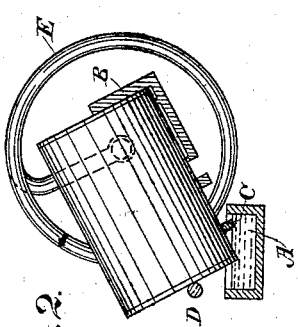

UNITED STATES PATENT OFFICE.

ERIK MANULA, OF ASTORIA, OREGON.

CAN-SOLDERING MACHINE.

SPECIFICATION forming part of Letters Patent No. 611,330, dated September 27, 1898.

Application filed June 8, 1898. Serial No. 682,874. (No model.)

*To all whom it may concern:*

Be it known that I, ERIK MANULA, a citizen of the United States, residing at Astoria, county of Clatsop, State of Oregon, have invented an Improvement in Can-Soldering Machines; and I hereby declare the following to be a full, clear, and exact description of the same.

My invention relates to an improvement in apparatus for continuously soldering; and it is especially applicable to soldering the ends upon cans of all descriptions, either round, square, flat, or oval, and of different lengths.

It consists, essentially, in the employment of a spiral carrier arranged with relation to the solder-bar and solder-bath so that the cans are caused to traverse from one end to the other, with the angle to be secured dipping into the melted solder.

It also consists in a device whereby square or angular cans are turned at intervals, so that each side of the angle is immersed in the solder during the travel of the can from one end to the other.

The invention further comprises details of construction which will be more fully explained by reference to the accompanying drawings, in which—

Figure 1 is a front view of my machine. Fig. 2 is a transverse section of the same.

The solder-bath A is essentially horizontal and of sufficient length so that all parts of the article to be soldered can be made to dip successively into the bath while moving from one end to the other.

B is an inclined support upon which the side of the can is adapted to rest, and C is the solder-bar which supports the lower end of the can with the edge dipping into the solder in the bath.

The bar or guide D is in line with the bottom of the can, which travels against it, and this bar and the solder-bar form the guides which determine the depth to which the edge or angle of the can dips into the solder.

E is a spiral coiled around and inclosing the inclined support B. This coil has a clear and unobstructed opening through its center, and it is centrally journaled at opposite ends and having a distance between the turns of the spiral sufficient to admit the cans which are to be soldered. Coils of different sizes may be used for different cans, being easily removable and replaced by others, as may be found necessary.

The cans lying upon the supports previously described project between the coils of the spiral and are advanced from one end to the other by turning the spiral, the cans rolling or turning upon their support, so as to present all the angles or edges to be soldered successively to the melted solder in the bath.

The spiral feeding device is driven by gearing, as shown at F, or by any suitable or desired means which will effect its revolution at the proper rate of speed.

The cans are delivered at one end, and by means of an extension G they are guided into the coils of the spiral. A second extension or blade H is carried by the spiral in its revolution and intervenes between the can which has passed into the spiral and the next can upon the feed-chute, so as to prevent the second can from passing into the same turn of the spiral which is occupied by the first one. The revolution of the spiral carries this stop out of the way in time to admit another can into the next turn of the spiral, and so on, all the turns being occupied by the cans, which are continuously moving from one end to the other.

At the feed end the supports are inclined, so as to direct the cans downward until they reach the horizontal portion, by which they are supported until they have passed through the solder-tank. At the opposite end is an upward incline which lifts the cans out of the solder, and they are delivered over the end of this incline by the last turn of the spiral and may pass into a receiving-chute or other device.

I is a projection fixed upon the support upon which the cans travel and by which they are straightened out if they become jammed or twisted in the machine.

When square cans are to be soldered, the solder-bar is provided with catches K, which project upwardly from its edge, so that the can lying upon its side will be engaged by the spiral and carried down the incline, so that one edge and angle dip into the solder. The can then being moved along comes in contact with the stop K upon the solder-bar, which arrests the lower angle, and the continued motion of the feed-spiral tips the can over about this angle, so that the next edge will lie in the solder. It passes along a short distance until this edge is soldered, when it encounters another of these stops and is again tipped over to bring the front edge into the solder, and so on until all four edges have been soldered.

It will be understood that any oval or irregular form of can may be thus acted upon and soldered.

Having thus described my invention, what I claim as new, and desire to secure by Letters Patent, is—

1. The combination in a soldering-machine of a solder-bath, an inclined track and support for the cans and an open spiral inclosing said support and between the turns of which the can-bodies are received, and means for rotating the spiral so that the cans are advanced from one end to the other of the solder-bath.

2. A solder-bath, an inclined support for the cans whereby the lower edge of the can is caused to dip into the solder, a rotatable open spiral essentially parallel with the can-support and solder-bath, said spiral inclosing said support and between the turns of which the bodies of the cans project, mechanism by which the spiral is rotated and guides by which the cans are admitted singly and successively between the turns of the spiral.

3. In a soldering-machine, a solder-bath, an inclined support, the body of which extends essentially parallel with the solder-bath so that the edges of the cans lying thereon will dip into the solder, an inclined end in connection with the feed-chute, down which the cans roll upon the horizontal portion, and an inclined end at the discharge by which the cans are raised out of the solder-bath, a rotary centrally-open spiral journaled essentially parallel with the solder-trough and can-support, and inclosing said support, devices at the receiving end whereby the cans are delivered successively between the turns of the spiral and a device at the discharge end by which they are delivered outwardly from the machine.

4. In a soldering apparatus, an essentially horizontal solder-trough, an inclined can-support parallel with the solder-trough upon which the cans are carried with their lower edges dipping into the solder, inclined receiving and discharge ends connected therewith, an open spiral journaled and rotatable essentially parallel with the solder-trough and can-support with the can-bodies projecting between the turns of the spiral, and inclosing said support, and devices upon the can-support whereby the cans are straightened and kept in line during their progress from end to end.

5. In an apparatus of the character described, an essentially horizontal solder-trough, an inclined can-support parallel therewith adapted to receive and support the can-bodies with the lower edges dipping into the solder, an open spiral journaled and revoluble parallel with the can-support and solder-bath with the bodies of the cans projecting between the turns of the spiral, and stops disposed at intervals below the bodies of the cans whereby the lower edges of polygonal cans will be intercepted and the cans turned by the advance of the spiral so as to present all their edges successively to the solder-bath.

In witness whereof I have hereunto set my hand.

ERIK MANULA.

Witnesses:
E. G. ROGERS,
J. R. BENNETT.